(12) United States Patent
Otuka (10) Patent No.: US 8,964,058 B2
(45) Date of Patent: Feb. 24, 2015

(54) ON-BOARD CAMERA SYSTEM FOR MONITORING AN AREA AROUND A VEHICLE

(75) Inventor: Kazuyoshi Otuka, Yokohama (JP)

(73) Assignee: Honda Elesys Co., Ltd., Kanagawa (JP)

( * ) Notice: Subject to any disclaimer, the term of this patent is extended or adjusted under 35 U.S.C. 154(b) by 370 days.

(21) Appl. No.: 13/439,522

(22) Filed: Apr. 4, 2012

(65) Prior Publication Data

US 2012/0300021 A1 Nov. 29, 2012

(30) Foreign Application Priority Data

Apr. 11, 2011 (JP) .................................. 2011-087585

(51) Int. Cl.
*H04N 5/228* (2006.01)
*H04N 5/232* (2006.01)
*H04N 5/345* (2011.01)

(52) U.S. Cl.
CPC ....... *H04N 5/23229* (2013.01); *H04N 5/23245* (2013.01); *H04N 5/3454* (2013.01)
USPC ........... 348/222.1; 348/36; 348/148; 348/149

(58) Field of Classification Search
CPC . H04N 5/2259; H04N 5/232; H04N 5/23229; H04N 5/23245
USPC .................................. 348/36, 39, 148, 222.1
See application file for complete search history.

(56) References Cited

U.S. PATENT DOCUMENTS

| | | | | |
|---|---|---|---|---|
| 5,999,662 | A * | 12/1999 | Burt et al. | 382/284 |
| 6,218,960 | B1* | 4/2001 | Ishikawa et al. | 340/901 |
| 6,393,163 | B1* | 5/2002 | Burt et al. | 382/294 |
| 8,373,773 | B2* | 2/2013 | Matsumoto et al. | 348/231.99 |
| 2006/0038895 | A1* | 2/2006 | Suzuki et al. | 348/222.1 |
| 2007/0263113 | A1* | 11/2007 | Baek et al. | 348/340 |
| 2009/0079585 | A1* | 3/2009 | Chinomi et al. | 340/901 |
| 2009/0096899 | A1* | 4/2009 | Quan | 348/273 |
| 2009/0149254 | A1* | 6/2009 | Kelly et al. | 463/36 |
| 2009/0174797 | A1* | 7/2009 | Hu et al. | 348/247 |
| 2010/0141734 | A1* | 6/2010 | Tani et al. | 348/36 |
| 2010/0208032 | A1* | 8/2010 | Kweon | 348/36 |
| 2010/0302403 | A1* | 12/2010 | Anderson | 348/222.1 |
| 2010/0303349 | A1* | 12/2010 | Bechtel et al. | 382/165 |

FOREIGN PATENT DOCUMENTS

| | | |
|---|---|---|
| JP | 2005-303450 A | 10/2005 |
| JP | 2010-271429 A | 12/2010 |

* cited by examiner

*Primary Examiner* — Sath V Perungavoor
*Assistant Examiner* — Nathnael Aynalem
(74) *Attorney, Agent, or Firm* — Keating & Bennett, LLP (57) ABSTRACT

An on-board camera system includes an imaging unit configured to capture an image around a vehicle, a wide-angle image generation unit configured to generate a wide-angle image of a desired size by performing reduction processing of the image obtained by the imaging unit, a standard image generation unit configured to generate a standard image of the desired size by extracting an image of a predetermined region from the image obtained by the imaging unit such that an optical axis of the image and the image size are the same as those of the wide-angle image, and an application processing unit configured to execute application processing using each of the wide-angle image and the standard image.

4 Claims, 7 Drawing Sheets

ON-BOARD CAMERA SYSTEM FOR MONITORING AN AREA AROUND A VEHICLE

CROSS-REFERENCE TO RELATED APPLICATIONS

Priority is claimed on Japanese Patent Application No. 2011-87585, filed Apr. 11, 2011, the contents of which are entirely incorporated herein by reference.

BACKGROUND OF THE INVENTION

1. Field of the Invention

The present invention relates to an on-board camera system which monitors the area around a vehicle.

2. Description of Related Art

Conventionally, in order to display an image obtained by capturing the area around a vehicle on a display device provided in the vehicle, a vehicle periphery monitoring device is known which monitors an area around a vehicle and which includes a camera that captures an area around a vehicle, a display device provided in the vehicle, and image processing means for encoding or decoding the image data captured by the camera using a wavelet transform. In recent years, in order to acquire peripheral information, the mounting of an on-board camera system, which uses a moving image, in vehicles is increasing. According to such an on-board camera system, in a situation in which the left and right sides of an intersection that a driver is approaching are not visible due to obstacles on the left and right sides of the driver's seat, an image in front of the vehicle is displayed on the display device so that the conditions at the intersection can be checked (for example, refer to JP-A-2005-303450 (Patent Document 1)).

Incidentally, in a front or rear monitoring device of a vehicle which uses an on-board camera system, it is desirable to be able to change the angle of view of an image captured by a camera since a region to be monitored changes with an object to be monitored. For example, it is desirable to obtain an image of a narrow angle of view in order to recognize preceding vehicles, obstacles, signs, and the like in distant places, while it is desirable to obtain an image of a wide angle of view in order to recognize vehicles traveling in parallel, obstacles, pedestrians, signs, and the like in the vicinity.

However, if two cameras are provided in order to obtain images corresponding to at least two angles of view, there is a problem in that it is not practical since the cost of the system is increased. In order to solve such a problem, a device for monitoring the outside of a vehicle capable of imaging an object accurately in a wide distance range from short distances to long distances while reducing the number of imaging elements is known (for example, refer to JP-A-2010-271429 (Patent Document 2)). This device for monitoring the outside of a vehicle includes an imaging lens system for long distances and an imaging lens system for short distances in order to acquire images of different angles of view.

SUMMARY OF THE INVENTION

However, since the device for monitoring the outside of a vehicle disclosed in Patent Document 2 is configured to include two different optical lenses, the device configuration becomes complicated. Accordingly, since the entire device becomes large and the cost of the device is increased, there is a problem in that the device is not suitable as an on-board device.

The present invention has been made in view of such a situation, and it is an object of the present invention to provide an on-board camera system capable of acquiring images of a plurality of angles of view using a single imaging device.

A first aspect of the present invention is an on-board camera system including: an imaging unit configured to capture an image around a vehicle; a wide-angle image generation unit configured to generate a wide-angle image of a desired size by performing reduction processing of the image obtained by the imaging unit; a standard image generation unit configured to generate a standard image of the desired size by extracting an image of a predetermined region from the image obtained by the imaging unit such that an optical axis of the image and the image size are the same as those of the wide-angle image; and an application processing unit configured to execute application processing using each of the wide-angle image and the standard image.

In the on-board camera system described above, the imaging unit may capture a Wide Quad Extended Graphics Array (WQXGA) image, and the wide-angle image and the standard image may be Video Graphics Array (VGA) images.

The on-board camera system described above may further include a demosaicing processing unit configured to perform demosaicing processing on an image. The wide-angle image generation unit and the standard image generation unit may generate the wide-angle image and the standard image, respectively, from an image after demosaicing processing of the demosaicing processing unit.

According to the present invention, since a wide-angle image of a desired size is generated by performing reduction processing of an image obtained by the imaging unit and a standard image of a desired size is also generated by extracting an image of a predetermined region from the image obtained by the imaging unit such that the optical axis of the image and the image size are the same as those of the wide-angle image, an effect in which the optical axes of the obtained images of different angles of view match each other and the acquisition time of the obtained images is the same is obtained. Therefore, by executing image processing using an image of a narrow angle of view, it is possible to recognize preceding vehicles, obstacles, signs, and the like in distant places. In addition, by executing the image processing using an image of a wide angle of view, an effect in which it is possible to recognize vehicles traveling in parallel, obstacles, pedestrians, signs, and the like in the vicinity is also obtained.

DETAILED DESCRIPTION OF THE INVENTION

Figure 1:
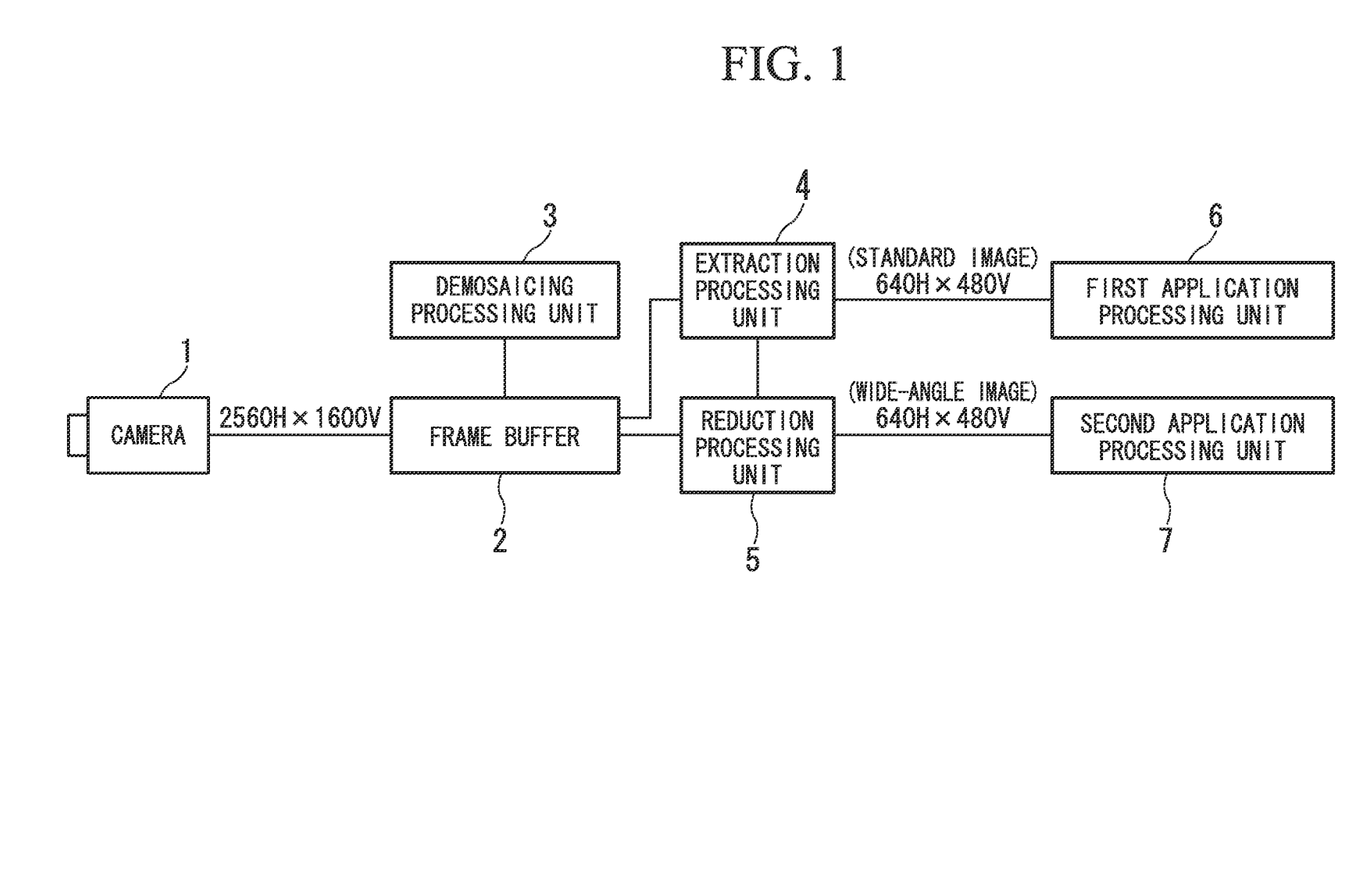
FIG. 1 is a block diagram showing the configuration of an embodiment of the present invention.

Hereinafter, an on-board camera system according to an embodiment of the present invention will be described with reference to the drawings. FIG. 1 is a block diagram showing the configuration of the embodiment. In this drawing, reference numeral 1 indicates a camera (imaging unit) which is mounted in a vehicle 10 (refer to FIG. 7) to capture a color image around the vehicle 10. The camera 1 includes an image sensor and an optical-system lens. The image sensor can obtain a Wide Quad Extended Graphics Array (WQXGA) image (2560H×1600V pixels). Reference numeral 2 indicates a frame buffer which stores one frame of an image output from the camera 1. Reference numeral 3 indicates a demosaicing processing unit configured to perform demosaicing processing on an image of one frame stored in the frame buffer 2 and stores the image after demosaicing processing in a region of the frame buffer 2 which is different from a region where a captured image is stored. The image captured by the camera 1 and the image after demosaicing processing are stored in the frame buffer 2.

Reference numeral 4 indicates an extraction processing unit (standard image generation unit) that generates a Video Graphics Array (VGA) image (640H×480H pixels) by extracting a predetermined region from the image stored in the frame buffer 2. Reference numeral 5 indicates a reduction processing unit (wide-angle image generation unit) that generates a VGA image (640H×480H pixels) by reducing the image stored in the frame buffer 2. Reference numeral 6 indicates a first application processing unit configured to execute an application (processing for recognizing preceding vehicles, obstacles, signs, and the like in distant places) based on an image output from the extraction processing unit 4. Reference numeral 7 indicates a second application processing unit configured to execute an application (processing for recognizing vehicles traveling in parallel, obstacles, pedestrians, signs, and the like in the vicinity) based on an image output from the reduction processing unit 5.

Figure 2:
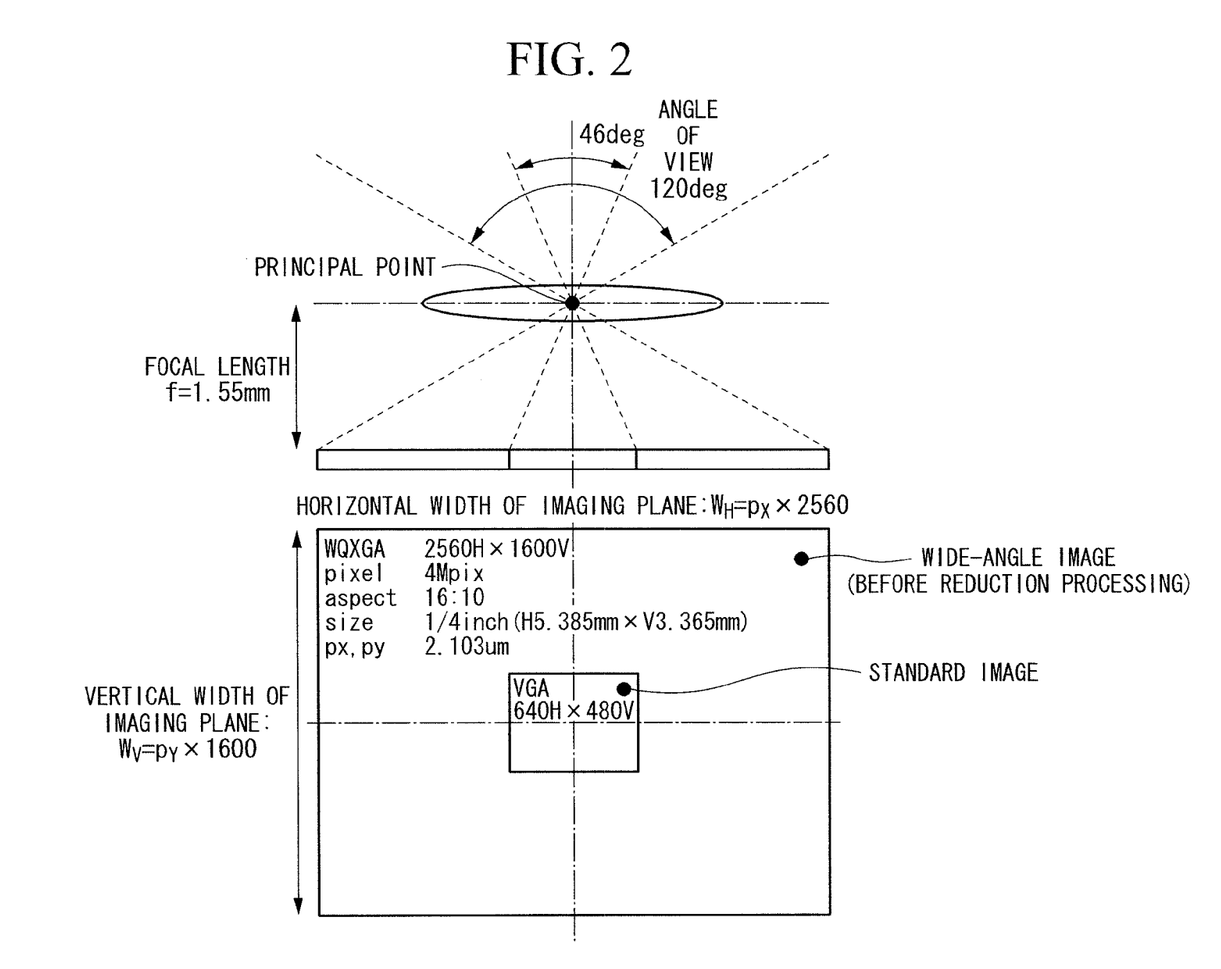
FIG. 2 is an explanatory view showing the relationship between the screen size and the angle of view.

In the following explanation, the image output from the extraction processing unit 4 is called a standard image, and the image output from the reduction processing unit 5 is called a wide-angle image. Here, the relationship of a standard image and a wide-angle image, an image sensor, and an optical lens will be described with reference to FIG. 2. The horizontal width and the vertical width of the imaging plane of the image sensor is 5.385 mm (2560 pixels) and 3.365 mm (1600 pixels), respectively. The focal length of the optical lens is f=1.55 mm. When forming an image on the imaging plane of the image sensor using the optical lens with a focal length of 1.55 mm, a wide-angle image (before reduction processing) with a horizontal angle of view of 120° is obtained. By performing reduction processing on this, a wide-angle image of 640H×480V pixels is obtained. In addition, by extracting an image of 640H×480V pixels from the wide-angle image (image captured by the image sensor) before reduction processing without changing the optical axis, a standard image of 640H×480V pixels of which the horizontal angle of view is 46° is obtained.

Figure 3:
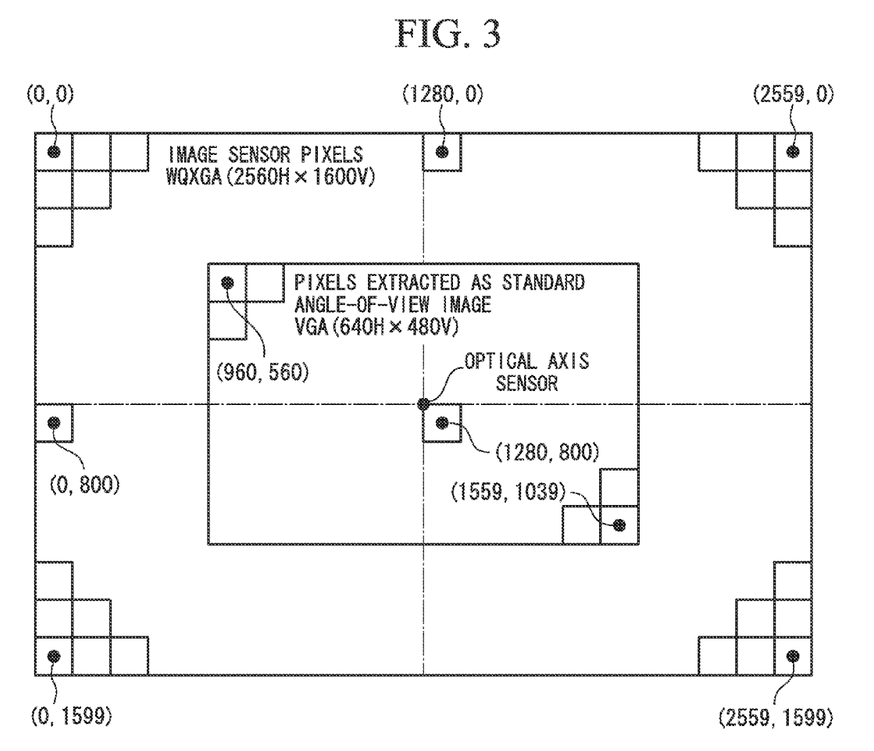
FIG. 3 is an explanatory view showing the positional relationship of pixels in a wide-angle image and a standard image.

FIG. 3 shows the positional relationship of pixels in a wide-angle image and a standard image. The wide-angle image is an image of 2560H×1600V pixels. Accordingly, a pixel in the upper left corner is (0, 0), a pixel in the upper right corner is (2559, 0), a pixel in the lower left corner is (0, 1599), and a pixel in the lower right corner is (2559, 1599). On the other hand, the standard image is an image of 640H×480V pixels. Accordingly, as the positions of pixels on the wide-angle image, a pixel in the upper left corner is (960,560) and a pixel in the lower right corner is (1559, 1039).

Next, an operation of the on-board camera system shown in FIG. 1 will be described with reference to FIGS. 1 and 4 to 6. First, the camera 1 captures an image and stores the obtained image (2560H×1600V pixels) in the frame buffer 2. When a new image is stored in the frame buffer 2, the demosaicing processing unit 3 performs demosaicing processing on the image stored in the frame buffer 2. When using an RGB Bayer type color image sensor, the demosaicing processing is a process of generating a brightness (Y) image, an R image, a G image, and a B image from the output signal of the image sensor. Since the demosaicing processing is a known process, explanation of the detailed processing operation will be omitted herein. The demosaicing processing unit 3 stores the brightness (Y) image, the R image, the G image, and the B image obtained by the demosaicing processing in the frame buffer. In this case, they are stored in a region on the frame buffer 2 which is different from a region for the image captured by the camera 1.

Figure 4:
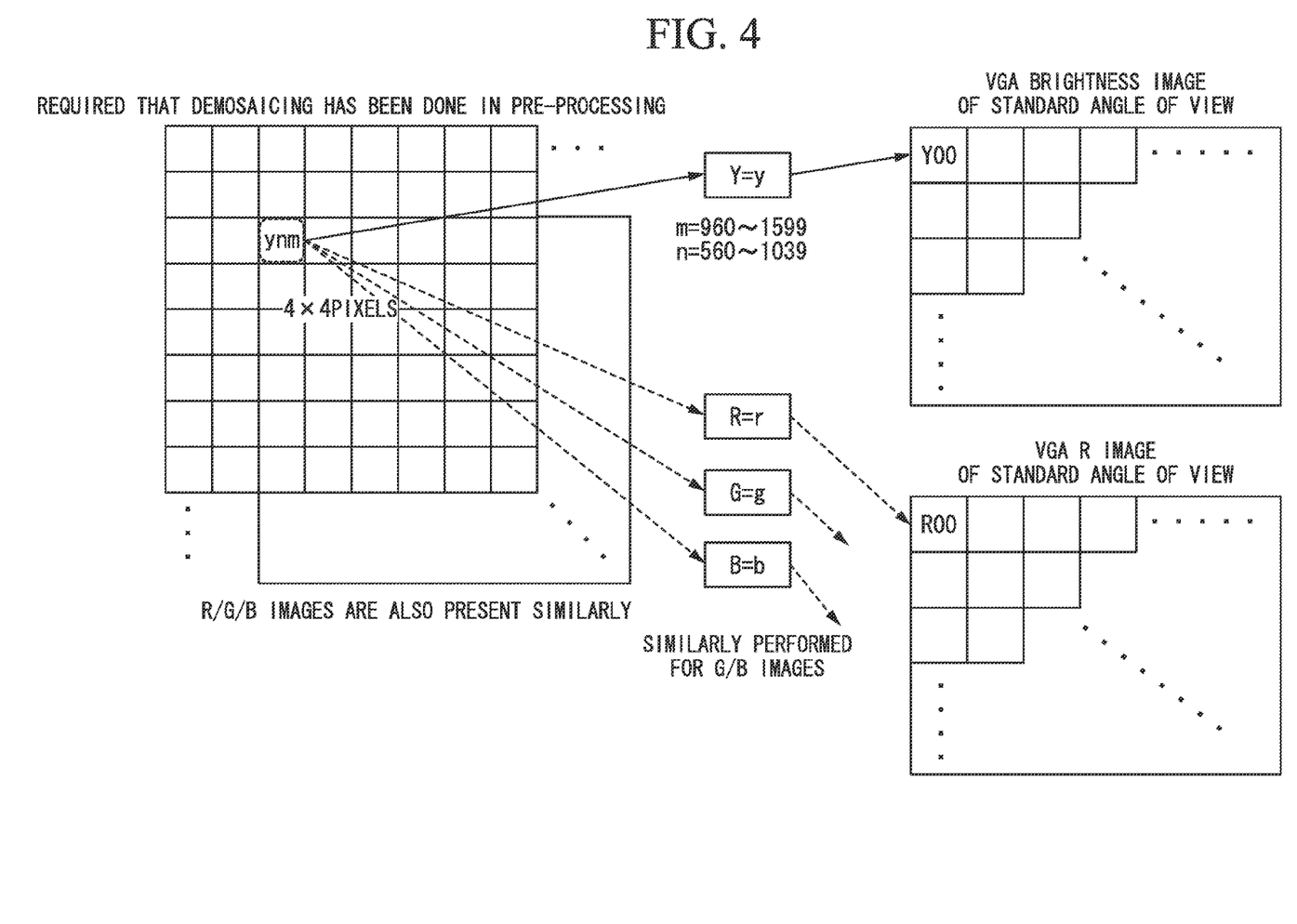
FIG. 4 is an explanatory view showing an operation of an extraction processing unit shown in FIG. 1.

Then, the extraction processing unit 4 generates a standard image by extracting a VGA image of a standard angle of view from each of the brightness (Y) image, the R image, the G image, and the B image after demosaicing processing using the values of pixels in a rectangular region surrounded by four pixels at pixel positions of (960,560), (1559, 560), (960, 1039), and (1559, 1039) (refer to FIG. 4). As a result, the VGA brightness image, R image, G image, and B image of a standard angle of view are obtained. The standard image (VGA brightness image, R image, G image, and B image of a standard angle of view) generated by the extraction processing unit 4 is output to the first application processing unit 6, and application processing is executed by the first application processing unit 6. The first application processing unit 6 executes processing for recognizing preceding vehicles, obstacles, signs, and the like in distant places, for example.

On the other hand, the reduction processing unit 5 calculates the values of pixels of an image after reduction from each of the brightness (Y) image, the R image, the G image, and the B image after demosaicing processing in parallel with the processing operation of the extraction processing unit 4 using Equation (1). That is, the reduction processing unit 5 calculates the pixel values of an image after reduction (wide-angle image) by adding all pixel values of 4×4 pixels and dividing the result by 16 to calculate the average pixel value of 16 pixels. The reduction processing unit 5 generates a wide-angle image by executing this processing on the entire plane of the image after demosaicing processing while changing the position of 4×4 pixels (refer to FIG. 5). As a result, the VGA brightness image, R image, G image, and B image of a wide angle of view are obtained. The wide-angle image (VGA brightness image, R image, G image, and B image of a wide angle of view) generated by the reduction processing unit 5 is output to the second application processing unit 7, and application processing is executed by the second application processing unit 7. The second application processing unit 7 executes processing for recognizing vehicles traveling in parallel, obstacles, pedestrians, signs, and the like in the vicinity, for example.

Figure 5:
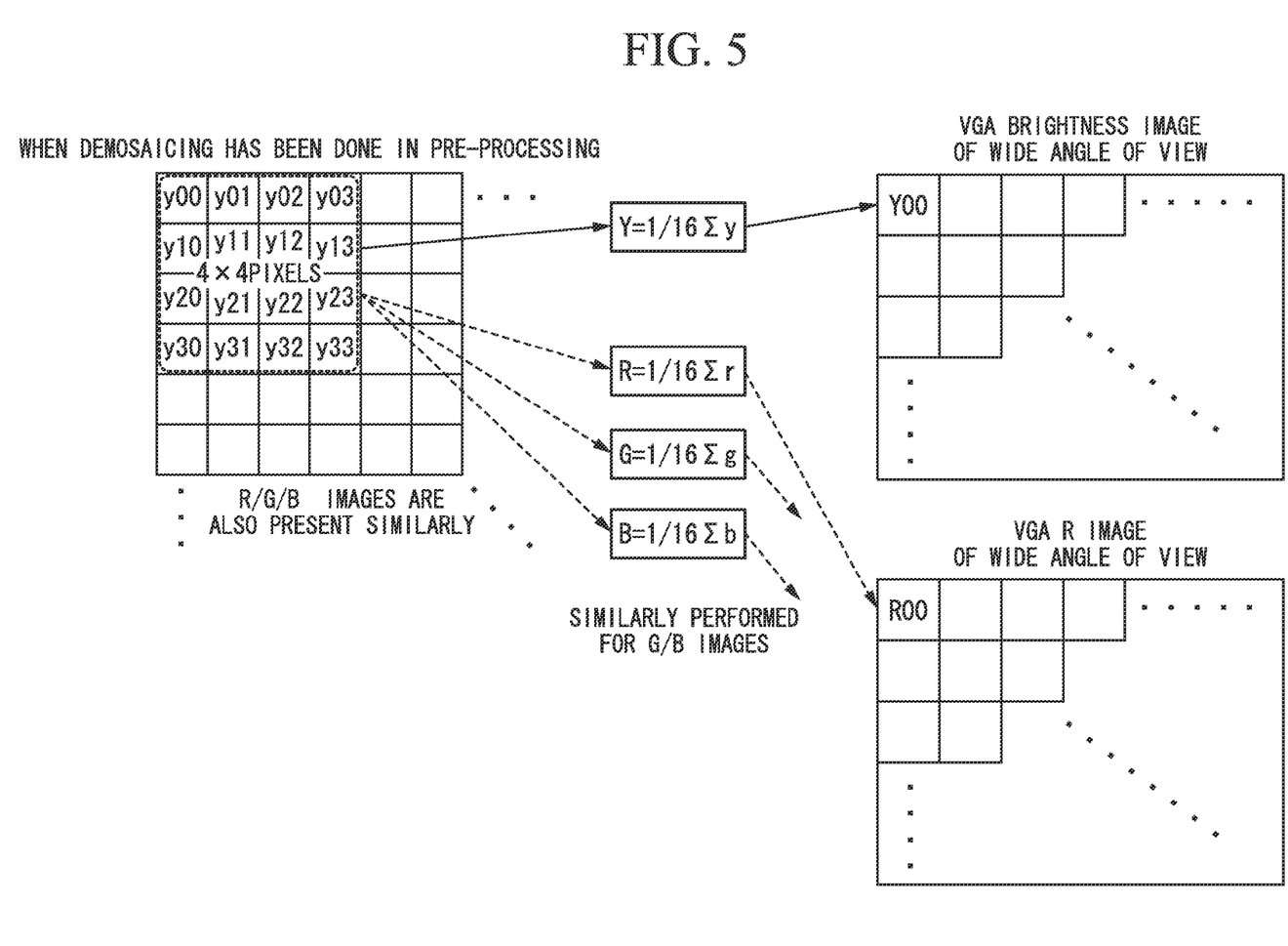
FIG. 5 is an explanatory view showing an operation of a reduction processing unit shown in FIG. 1.

Brightness value $$Y_{nm} = \frac{1}{16} \sum_{j=4n}^{4n+3} \left( \sum_{i=4m}^{4m+3} y_{ji} \right) \qquad (1)$$

($y_{ji}$: brightness value of an original image
$Y_{nm}$: brightness value of a wide-angle VGA image)

In addition, although the processing operation of generating a wide-angle image from an image after demosaicing processing of the demosaicing processing unit 3 has been described above, it is not necessary to perform demosaicing processing, and a wide-angle image may be directly generated from an image output from an RGB Bayer type color image sensor. In this case, the reduction processing unit 5 generates a wide-angle image directly from the output image of the camera 1 stored in the frame buffer 2. It is preferable that the reduction processing unit 5 calculate the values of pixels of an image after reduction from the output image (RGB Bayer type image) of the camera 1 stored in the frame buffer 2 using Equations (2) and (3) (refer to FIG. 6).

Figure 6:
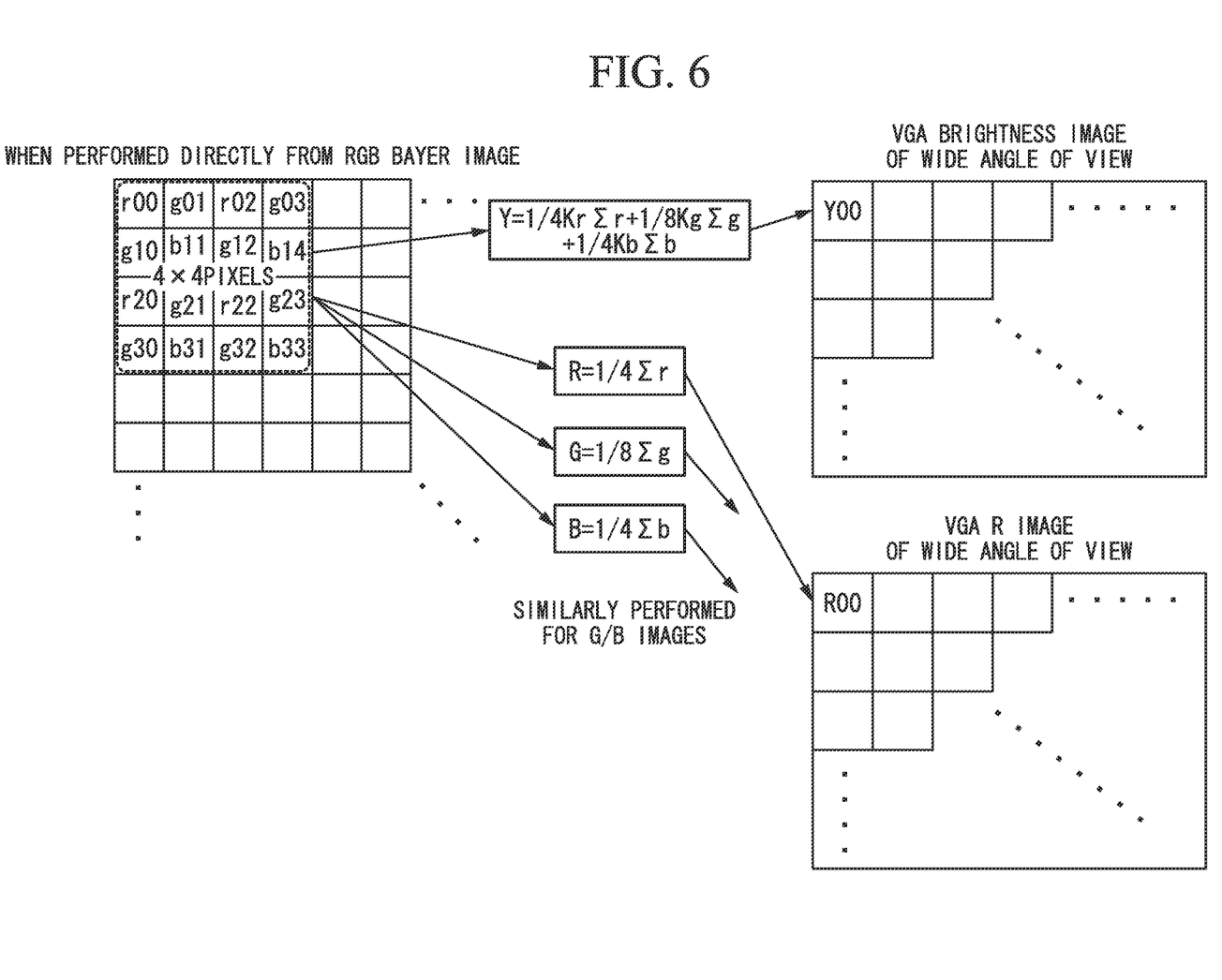
FIG. 6 is an explanatory view showing the operation of the reduction processing unit shown in FIG. 1.

Brightness Value $$Y_{nm} = \tag{2}$$
$$\left\{ \frac{K_r}{4} \sum_{j=4n}^{4n+3} \left( \sum_{i=4n}^{4m+3} r_{ji} \right) + \frac{K_g}{8} \sum_{j=4n}^{4n+3} \left( \sum_{i=4m}^{4m+3} g_{ji} \right) + \frac{K_b}{4} \sum_{j=4n}^{4n+3} \left( \sum_{i=4m}^{4m+3} b_{ji} \right) \right\} \cdot R \text{ value}$$

$$R_{nm} = \frac{1}{4} \sum_{j=4n}^{4n+3} \left( \sum_{i=4m}^{4m+3} r_{ji} \right), \ G_{nm} = \frac{1}{8} \sum_{j=4n}^{4n+3} \left( \sum_{i=4m}^{4m+3} g_{ji} \right), \tag{3}$$

$$B_{nm} = \frac{1}{4} \sum_{j=4n}^{4n+3} \left( \sum_{i=4m}^{4m+3} b_{ji} \right)$$

($r_{ji}$, $g_{ji}$, $b_{ji}$: RGB values of an original image

Here, the value of a pixel which is not present is assumed to be 0 $Y_{nm}$, $R_{nm}$, $G_{nm}$, $B_{nm}$: brightness value and RGB values of a wide-angle VGA image $K_r$, $K_g$, $K_b$: values of Table 1 are known as examples)

TABLE 1

| Standard | $K_r$ | $K_g$ | $K_b$ | Remarks |
|---|---|---|---|---|
| ITU-R BT. 601 | 0.29891 | 0.58661 | 0.11448 | RGB→Y term of YUV |
| ITU-R BT. 709 | 0.2126 | 0.7152 | 0.0722 | RGB→Y term of YCbCr |

In addition, the camera 1 may be a camera which outputs a monochrome image (brightness image). Also in this case, by the processing described above, it is possible to generate a wide-angle image of a desired size by performing reduction processing of a captured image and also to generate a standard image of a desired size by extracting an image of a predetermined region from the captured image such that the optical axis of the image and the image size are the same as those of the wide-angle image.

In addition, the first and second application processing units 6 and 7 shown in FIG. 1 may be unified. In this case, one application processing unit may execute the application processing after two images (a standard image and a wide-angle image) are input thereto.

In addition, although the processing operation of generating images corresponding to two kinds of angles of view, that is, the standard image of an angle of view of 46° and the wide-angle image of an angle of view of 120° has been described above, other angles of view may also be adopted. Since the angle of view is determined by the relationship between the size of the imaging plane and the focal length of the optical lens, an image of an arbitrary angle of view may be generated, when it is necessary, by adjusting them.

In addition, the angle of view of an image to be generated is not limited to two kinds, and it is also possible to generate different images of three or more kinds of angles of view. An image of an arbitrary angle of view may be generated by extracting an image of an arbitrary angle of view in the conditions in which a wide-angle image of a horizontal angle of view of 120° is an image of a maximum angle of view and a standard image of a horizontal angle of view of 46° is an image of a minimum angle of view and then reducing the image. For example, the extraction processing unit 4 cuts an image from a wide-angle image of a horizontal angle of view of 120° such that the horizontal angle of view becomes 100° and outputs the cut image to the reduction processing unit 5, and the reduction processing unit 5 performs reduction processing so as to acquire a VGA image (640H×480V pixels). As a result, an image of an arbitrary angle of view can be generated. In this manner, it is possible to improve the function of the application processing so that an image of a required angle of view can be generated in the application processing.

Figure 7:
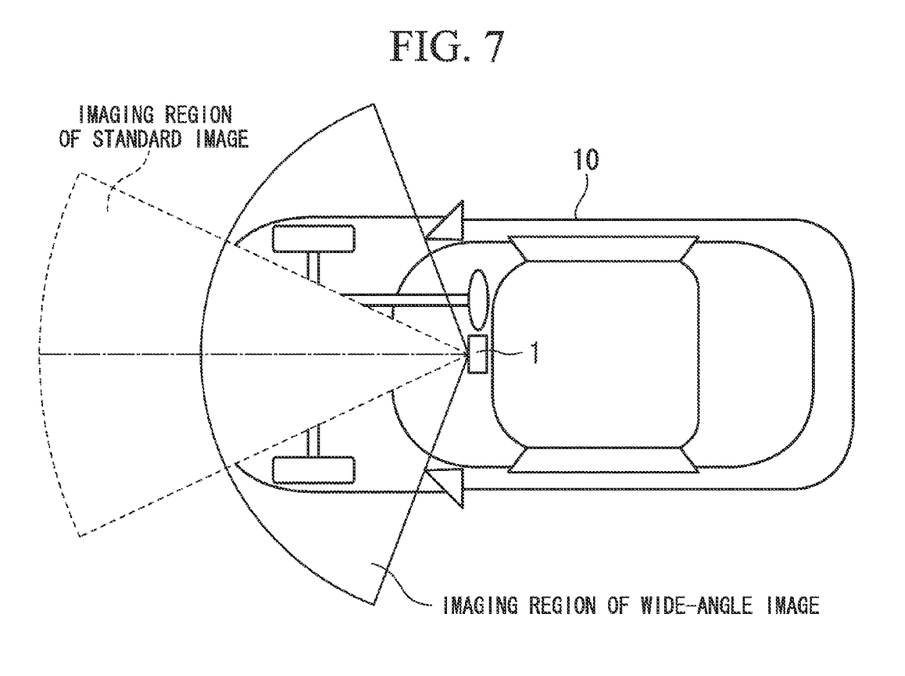
FIG. 7 is an explanatory view showing the relationship between a vehicle and the angle of view.

As described above, since a wide-angle image of a desired size is generated by performing reduction processing of a captured image, and a standard image of a desired size is also generated by extracting an image of a predetermined region from the captured image such that the optical axis of the image and the image size are the same as those of the wide-angle image, it is possible to acquire an image of different angles of view having the same optical axis and the same acquisition time as that of the captured image. In addition, as shown in FIG. 7, images of a plurality of angles of view can be generated using only a single imaging unit (camera 1) mounted in the vehicle 10. Accordingly, an application can be executed using images of different imaging regions. In this case, by executing the image processing using an image of a narrow angle of view (standard image), it is possible to recognize preceding vehicles, obstacles, signs, and the like in distant places. In addition, by executing the image processing using an image of a wide angle of view (wide-angle image), it is possible to recognize vehicles traveling in parallel, obstacles, pedestrians, signs, and the like in the vicinity.

Moreover, an image production processing may be performed by recording a program for performing the control functions of the processing units shown in FIG. 1 in a computer-readable recording medium and by causing a computer system to read and execute the program recorded in the recording medium. Here, the "computer system" includes an OS or hardware such as peripherals. Examples of the "computer-readable recording medium" include portable mediums such as a flexible disk, a magneto-optical disc, a ROM, and a CD-ROM, and memory devices, such as a hard disk, built in the computer system. Furthermore, the "computer-readable recording medium" may include a recording medium dynamically storing a program for a short time like a transmission medium when the program is transmitted via a network such as the Internet or a communication line such as a phone line and a recording medium storing a program for a predetermined time like a volatile memory (RAM) in a computer system serving as a server or a client in that case.

The programs may be transmitted from a computer system having the programs stored in a storage device thereof or the like to another computer system through a transmission medium or by carrier waves in the transmission medium. The "transmission medium" which transmits a program means a medium having a function of transmitting information and examples thereof include a network (communication network) such as the Internet and a communication link (communication line) such as a telephone line. The program may realize some of the above-described functions. The program may realize the above-described functions in combination with a program already recorded in a computer system, that is, the program may be a differential file (differential program).

The present invention is applicable to a use in which acquisition of images of different angles of view by using single image sensor is required.

What is claimed is:

1. An on-board camera system comprising:
   a single camera configured to capture an image around a vehicle;
   a wide-angle image generation unit configured to generate a wide-angle image of a desired size by performing reduction processing of the image obtained by the single camera;
   a standard image generation unit configured to generate a standard image of the desired size by extracting an image of a predetermined region from the image obtained by the single camera such that an optical axis of the image and the image size are the same as those of the wide-angle image; and
   an application processing unit configured to execute application processing using each of the wide-angle image and the standard image.

2. The on-board camera system according to claim 1, wherein the single camera is configured to capture a Wide Quad Extended Graphics Array (WQXGA) image, and the wide-angle image and the standard image are Video Graphics Array (VGA) images.

3. The on-board camera system according to claim 1, further comprising:
   a demosaicing processing unit configured to perform demosaicing processing on an image,
   wherein the wide-angle image generation unit and the standard image generation unit are configured to generate the wide-angle image and the standard image, respectively, from an image after demosaicing processing of the demosaicing processing unit.

4. The on-board camera system according to claim 2, further comprising:
   a demosaicing processing unit configured to perform demosaicing processing on an image,
   wherein the wide-angle image generation unit and the standard image generation unit are configured to generate the wide-angle image and the standard image, respectively, from an image after demosaicing processing of the demosaicing processing unit.

* * * * *